US011228277B2

(12) United States Patent
Buenemann (10) Patent No.: US 11,228,277 B2
(45) Date of Patent: Jan. 18, 2022

(54) METHOD AND DEVICE FOR DETECTING A MAXIMUM SYSTEM POWER OUTPUT OF A PHOTOVOLTAIC SYSTEM

(71) Applicant: SMA Solar Technology AG, Niestetal (DE)

(72) Inventor: Mathias Buenemann, Kassel (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 46 days.

(21) Appl. No.: 16/792,375

(22) Filed: Feb. 17, 2020

(65) Prior Publication Data
US 2020/0186083 A1 Jun. 11, 2020

Related U.S. Application Data

(63) Continuation of application No. PCT/EP2018/071844, filed on Aug. 12, 2018.

(30) Foreign Application Priority Data

Aug. 17, 2017 (DE) .......................... 102017118764.2

(51) Int. Cl.
*H02J 1/00* (2006.01)
*H02J 3/00* (2006.01)
(Continued)

(52) U.S. Cl.
CPC .............. *H02S 50/00* (2013.01); *H02J 3/381* (2013.01); *H02J 2300/26* (2020.01)

(58) Field of Classification Search
CPC ....... H02S 50/00; H02J 3/381; H02J 2300/26; Y02E 10/56

(Continued)

(56) References Cited

U.S. PATENT DOCUMENTS 8,346,400 B2 1/2013 Gonzalez Senosiain
8,401,706 B2 3/2013 Moore
(Continued)

FOREIGN PATENT DOCUMENTS

DE 102010038941 A1 2/2012
DE 202010016207 U1 3/2012
WO 2012017068 A2 2/2012

*Primary Examiner* — Richard Tan
(74) *Attorney, Agent, or Firm* — Eschweiler & Potashnik, LLC (57) ABSTRACT

A method for determining a system power, which is maximally possible at a point in time, of a photovoltaic system, comprising a plurality of photovoltaic generators, wherein the photovoltaic system is not operated at the maximally possible system power at the point in time, and wherein at least some of the photovoltaic generators of the plurality of photovoltaic generators are operated at different operating points at the point in time, is disclosed. The method and associated apparatus includes defining a mapping between the different operating points of the individual photovoltaic generators and virtual operating points of a standard generator, determining virtual operating points of a standard generator corresponding to the different operating points of the individual photovoltaic generators based on the mapping, determining a characteristic curve of the standard generator from the virtual operating points of the standard generator, determining a maximum of the characteristic curve, and determining the maximally possible system power at the point in time from the maximum of the characteristic curve of the standard generator.

12 Claims, 4 Drawing Sheets

(51) Int. Cl.
 *H02S 50/00* (2014.01)
 *H02J 3/38* (2006.01)
(58) Field of Classification Search
 USPC .......................................................... 307/82
 See application file for complete search history.

(56) References Cited

U.S. PATENT DOCUMENTS

| | | |
|---|---|---|
| 2012/0197557 A1 | 8/2012 | Bettenwort |
| 2013/0241448 A1* | 9/2013 | Yaoi .......................... G05F 1/67 |
| | | 318/139 |
| 2014/0077608 A1* | 3/2014 | Nosaka .................. H02J 3/385 |
| | | 307/77 |

* cited by examiner

METHOD AND DEVICE FOR DETECTING A MAXIMUM SYSTEM POWER OUTPUT OF A PHOTOVOLTAIC SYSTEM

CROSS REFERENCE TO RELATED APPLICATIONS

This application is a continuation of International Patent Application number PCT/EP2018/071844, filed on Aug. 12, 2018, which claims priority to German Patent Application number 10 2017 118 764.2, filed on Aug. 17, 2017, and is hereby incorporated by reference in its entirety.

FIELD

The disclosure relates to a method for detecting a system power of a photovoltaic system. The disclosure furthermore relates to a photovoltaic system having a plurality of photovoltaic generators, which are connected to individual DC/DC and/or DC/AC converters. The photovoltaic system has a controller for controlling the individual DC/DC and/or DC/AC converters, so that different operating points of the individual photovoltaic generators can be set.

BACKGROUND

EP 2 328 259 A1 discloses a method for power management in a photovoltaic system, in which, in order to provide an active power reserve by means of the photovoltaic system, a first group of photovoltaic generators is operated without the active power thereof being limited. A maximally possible system power of the photovoltaic system is estimated from the active power of the first group of photovoltaic generators. A second group of photovoltaic generators of the photovoltaic system is operated with restriction of their power to a value that is determined based on the maximally possible system power and the desired active power reserve. Alternatively, the maximally possible system power can be determined by means of a calibrated photovoltaic cell or by means of sampling of a characteristic curve of the photovoltaic generators by varying the operating voltage of the photovoltaic generators.

DE 10 2010 038 941 A1 discloses a method for detecting an amount of infeed energy of a photovoltaic system, which was potentially possible in a time period but was not actually fed in, the photovoltaic system having a plurality of inverters for feeding electrical energy from in each case one or more photovoltaic generators into an AC grid. The photovoltaic system is coupled to the AC grid, and the inverters are operated differently and in a manner that an amount of infeed energy that is reduced compared to the amount of infeed energy that was potentially possible is fed in. In this case, at least one inverter is operated at its maximum power point so that the maximally possible power is fed in by this inverter. Whereas at least one other inverter is operated with a lower infeed power than its maximally possible infeed power. Different subsets of the inverters may also be operated in normal operation (with the maximally possible infeed power) in different partial time periods in order to detect the operating points of maximum power thereof directly. DE 10 2010 038 941 A1 also discloses to operate one inverter differently in different partial time periods to determine an amount of infeed energy of the photovoltaic system, which was potentially possible in a time period but was not actually fed in. It samples a subregion of a voltage/power characteristic curve of the connected photovoltaic generators in which an operating point with a maximally possible generator power lies. The voltage/power characteristic curve and the operating point of maximally possible generator power thereof are extrapolated from the operating points thereof that are detected during sampling. In this case, the integral of the different electrical powers fed in over the time period represents the amount of actual infeed energy which is reduced compared to the amount of infeed energy that was potentially possible in the time period.

SUMMARY

The disclosure is directed to an efficient method for determining a system power, which is maximally possible at a point in time. The system is not operated at the maximally possible system power at the point in time. the result is, on the one hand, to keep available a particular magnitude of control power by the system and, on the other hand, to operate the system below its maximally possible system power by not more than the magnitude of control power kept available, in order to thus maximize the system power actually yielded during the provision of the control power.

In a method according to the disclosure for detecting a system power, which is maximally possible at a point in time, of a photovoltaic system, which is not being operated at the maximally possible system power at the point in time and which comprises a plurality of photovoltaic generators, the photovoltaic generators are operated at the point in time at least partly at different operating points. Relationships between the different operating points of the individual photovoltaic generators and virtual operating points of a standard generator are defined. A characteristic curve of the standard generator and a maximum of the characteristic curve at the point in time are determined from the virtual operating points of the standard generator that correspond to the different operating points of the individual photovoltaic generators; and the maximally possible system power at the point in time is determined from the maximum of the characteristic curve of the standard generator.

In the method according to the disclosure, the standard generator serves as a reference system, in which the different operating points of the photovoltaic generators are evaluated. The relationships between the different operating points of the individual photovoltaic generators and the virtual operating points of the standard generator compensate for the differences between the photovoltaic generators and map the individual photovoltaic generators with their operating points onto the standard generator. In other words, mathematical models describe the relationships between the different operating points of the individual photovoltaic generators and the virtual operating points of the standard generator. Owing to the resulting virtual operating points of the standard generator, it is possible to determine the characteristic curve of the standard generator at the respective point in time and therefore also the maximum of the characteristic curve at the respective point in time. The maximally possible system power at the respective point in time can be determined from the maximum of the characteristic curve of the standard generator. For this purpose, in particular the relationships between the operating points of the individual photovoltaic generators and the virtual operating points of the standard generator can be used in order to map the maximum of the characteristic curve of the standard generator onto a corresponding operating point of maximum power of the individual photovoltaic generators.

The method according to the disclosure may also be illustrated such that the characteristic curve of the standard generator is sampled at each point in time with the photovoltaic generators operated at different operating points. The maximally possible system power can thus be determined from the maximum of the characteristic curve of the standard generator at each point in time and without variation in the operating points of the individual photovoltaic generators. No fluctuating output powers from the individual photovoltaic generators, which would have to be compensated as far as possible in real time, therefore occur in the performance of the method according to the disclosure. Instead, in the method according to the disclosure, the output power of the individual photovoltaic generators can be adjusted primarily to the system power that is intended to be provided at the respective point in time by the photovoltaic system.

In order to be able to determine the characteristic curve of the standard generator reliably from the virtual operating points of the standard generator, it may be advantageous to operate the photovoltaic generators at the respective point in time at operating points that correspond to at least three different virtual operating points of the standard generator. The at least three different virtual operating points may be distributed over the entire characteristic curve, for example evenly or may be concentrated in the region of the maximum thereof.

In one embodiment, the individual photovoltaic generators are operated at the respective point in time at operating points that correspond to at least five or at least seven different virtual operating points of the standard generator in order to have a sufficient statistical basis for the determination of the characteristic curve of the standard generator and the maximum thereof.

In one embodiment of the method according to the disclosure, the operating points at which the individual photovoltaic generators are operated at the respective point in time comprise operating points that correspond to virtual operating points of the standard generator, which are distributed over a region of the characteristic curve of the standard generator adjoining the maximum thereof. This embodiment of the method according to the disclosure takes into account the fact that photovoltaic generators of a photovoltaic system are often curtailed only by shifting their operating points in a direction away from its operating point of maximum power. This procedure does not have to be changed when carrying out the method according to the disclosure. Instead, the characteristic curve of the standard generator can be sampled precisely in this direction. In this case, although one of the different operating points at which the individual photovoltaic generators are operated may be the operating point of maximum power of one of the photovoltaic generators, this is neither necessary nor sought in the method according to the disclosure.

In practice, in the method according to the disclosure, the individual photovoltaic generators are regularly operated at the different operating points with the aid of individual DC/DC and/or DC/AC converters. In a photovoltaic system, individual DC/DC and/or DC/AC converters are mostly present for the individual photovoltaic generators that can be operated at different operating points in order to connect the individual photovoltaic generators to a single output of the photovoltaic system and/or to connect all of the photovoltaic generators to an external grid despite their different operating points.

To determine the maximally possible system power at the respective point in time, specifically the maximum powers of the individual photovoltaic generators can be calculated from the maximum of the characteristic curve of the standard generator and the relationships between the operating points of the individual photovoltaic generators and the virtual operating points of the standard generator. In other words, as has already been indicated above, the maximum of the characteristic curve of the standard generator is mapped onto an operating point of maximum power of each individual photovoltaic generator. The corresponding maximum powers of the individual photovoltaic generators are then added together.

The relationships between the operating points of the individual photovoltaic generators and the virtual operating points of the standard generator should take into account various aspects from which differences between the characteristic curves of the individual photovoltaic generators can result. These include:

different rated power of the individual photovoltaic generators;

different types of individual photovoltaic generators;

production tolerances of the individual photovoltaic generators;

different degenerating effects of the individual photovoltaic generators;

different orientations of the individual photovoltaic generators toward the sun;

different shadings of the individual photovoltaic generators;

different temperatures of the individual photovoltaic generators;

different types of individual DC/DC and/or DC/AC converter and production tolerances of the individual DC/DC and/or DC/AC converters and also all further differences between the individual DC/DC and/or DC/AC converters.

Since some of the above aspects, such as for example different shadings or different temperatures, of the individual photovoltaic generators change over time, one embodiment contemplates that the relationships between the operating points of the individual photovoltaic generators and the virtual operating points of the standard generator are determined not just once but specifically for the respective point in time. In other words, these relationships may be updated continuously in order to be able to determine from the maximum of the characteristic curve of the standard generator the maximally possible system power at the respective point in time as exactly as possible.

When the characteristic curve of the standard generator is determined from its virtual operating points that correspond to the different operating points of the individual photovoltaic generators, a model characteristic curve may be fitted to the virtual operating points. This model characteristic curve may have a limited number of variables, through the variation of which the model characteristic curve can be fitted to the virtual operating points. Therefore, it is taken into account on the one hand that the characteristic curve of the standard generator has a wellknown and characteristic form. On the other hand, in this way, the fitting of the model characteristic curve to the virtual operating points is simplified and more reliable even in the case of only a few virtual operating points or statistical fluctuations between the virtual operating points.

When the model characteristic curve is fitted to the virtual operating points, operating points that deviate from the best-possible fitted model characteristic curve beyond a prescribed extent may be discarded. However, these discarded operating points are not, in one embodiment, considered as statistical anomalies but instead are used to update the relationships between the operating points of the photovoltaic generators, which belong to the discarded operating points, and the virtual operating points of the standard generator. This updating of the relationships means that they are modified so that the respective virtual operating points approximate the fitted model characteristic curve. In other words, the method according to the disclosure itself identifies when the real ratios between the operating points of individual photovoltaic generators and the virtual operating points of the standard generator change so that the relationships defined in accordance with the disclosure have to be adjusted thereto, and the method according to the disclosure also indicates the direction of the necessary adjustment. In this case, the adjusted relationships can initially be used only for determining the maximally possible system power at the respective point in time taking into account the operating points that deviate initially from the best-possible adjusted model characteristic curve before the initially deviating operating points are also taken into account in the adjustment of the model characteristic curve.

When the method according to the disclosure is carried out, in order to provide a particular magnitude of control power with the photovoltaic system, it is simplified to set the different operating points of the individual photovoltaic generators so that the photovoltaic system is operated at each point in time at the highest possible actual system power, which, however, still lies by the prescribed magnitude of control power below the system power of the photovoltaic system that is maximally possible at the point in time.

In a photovoltaic system according to the disclosure having a plurality of photovoltaic generators, which are connected to individual DC/DC and/or DC/AC converters, and having a controller for the individual DC/DC and/or DC/AC converters, by way of which different operating points of the connected photovoltaic generators are able to be set, the controller is configured to carry out the method according to the disclosure. The controller can thus set the different operating points in particular so that the photovoltaic system lies at each point in time at which the control power retained by same is not required by at least a prescribed magnitude of the desired control power below the maximally possible system power of the photovoltaic system at the point in time.

Advantageous developments of the disclosure are obtained from the patent claims, the description and the drawings. The advantages cited in the description for features and combinations of multiple features are merely exemplary and can take effect alternatively or cumulatively without the advantages necessarily needing to be achieved by embodiments according to the disclosure. Without this altering the subject matter of the appended patent claims, the following applies in respect of the disclosure content of the original application documents and the patent: further features are evident from the drawings—in particular the depicted geometries and the relative dimensions as well as the relative arrangement and operative connection of multiple subassemblies in relation to one another. The combination of features of different embodiments of the disclosure or of features of different patent claims is likewise possible as a departure from the chosen dependency references of the patent claims and is suggested hereby. This also relates to such features as are depicted in separate drawings or are mentioned in the description thereof. These features can also be combined with features of different patent claims. Similarly, features presented in the patent claims can be dropped for further embodiments of the disclosure.

The features cited in the patent claims and the description should be understood in respect of their number such that precisely this number or a greater number than the cited number is present, without explicit use of the adverb "at least" being required. If the text thus refers to one DC/DC converter, for example, then this should be understood to mean that precisely one DC/DC converter, two DC/DC converters or more DC/DC converters are present.

The features stated in the patent claims can be supplemented by other features or may be the only features that the respectively claimed subject matter has.

BRIEF DESCRIPTION OF THE FIGURES

The disclosure is explained and described in more detail below on the basis of example embodiments that are illustrated in the figures.

DETAILED DESCRIPTION

The disclosure relates to a method for detecting a system power of a photovoltaic system, which is maximally possible at a point in time. whereas the photovoltaic system is not operated at the maximally possible system power at the point in time. The photovoltaic system comprises a plurality of photovoltaic generators, wherein the photovoltaic generators are operated at the point in time at least partly at different operating points. The disclosure furthermore relates to a photovoltaic system having a plurality of photovoltaic generators, which are connected to individual DC/DC and/or DC/AC converters. The photovoltaic system having a controller for controlling the individual DC/DC and/or DC/AC converters, so that different operating points of the individual photovoltaic generators can be set.

The disclosure further relates to a strategy to control a system power of a photovoltaic system below a maximally possible system power at a point in time to provide power e.g. for net services or net stabilizing services.

Figure 1:
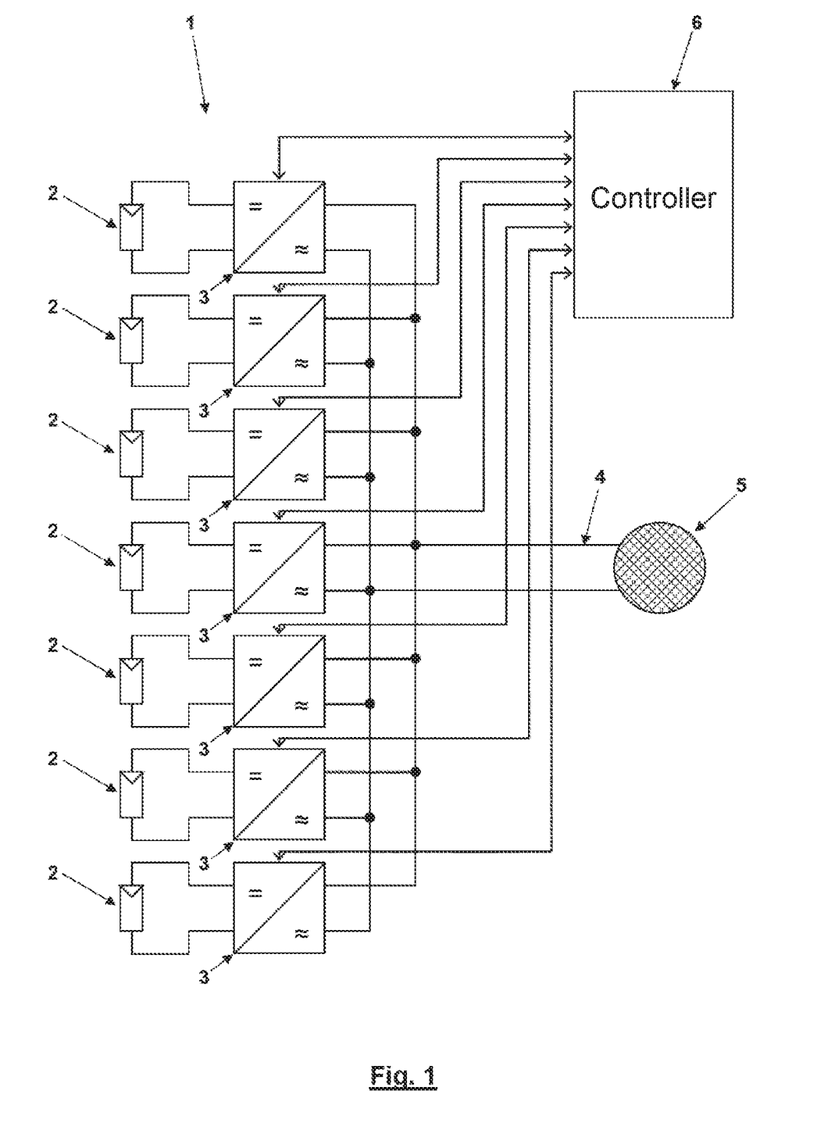
FIG. 1 schematically shows a photovoltaic system according to the disclosure.

The photovoltaic system 1 illustrated in FIG. 1 has a plurality of, in this case seven, photovoltaic generators 2, which are each connected to a common output 4 of the photovoltaic system by means of a DC/AC converter 3. The photovoltaic system 1 feeds electrical power into an AC grid 5 via the common output 4. A controller 6 of the photovoltaic system controls the DC/AC converters 3. The controller 6 simultaneously receives information from the DC/AC converters 3 and evaluates it. In particular, the controller 6 specifies to the individual DC/AC converters 3 how much power they each feed into the AC grid 5, and this specification is carried out depending on how great a maximally possible system power of the photovoltaic system 1 is at present. The controller 6 in a basic operation thus actuates the individual DC/AC converters so that together they feed an actual system power into the AC grid 5, which power remains by the magnitude of a desired control power below the maximally possible system power. This magnitude of the desired control power is then available in a control power operation of the photovoltaic system as control power for the AC grid 5 and can be fed into the AC grid 5 by the controller 6 by corresponding actuation of the DC/AC converters 3 in needed proportions.

In other words, the photovoltaic system 1 is operated in a curtailed manner in its basic operation. This takes place according to the method according to the disclosure such that the controller 6 curtails the individual DC/AC converters 3 differently, with the result that the photovoltaic generators 2 connected thereto are operated at different operating points. These different operating points of the photovoltaic generators 2 are then mapped onto virtual operating points of a standard generator. This mapping takes place according to relationships, which are defined for the respective point in time, between the operating points of the individual photovoltaic generators 2 and the virtual operating points of the standard generator, with which all of the relevant differences between the individual photovoltaic generators 2 and the present operating conditions thereof are taken into account.

Figure 2:
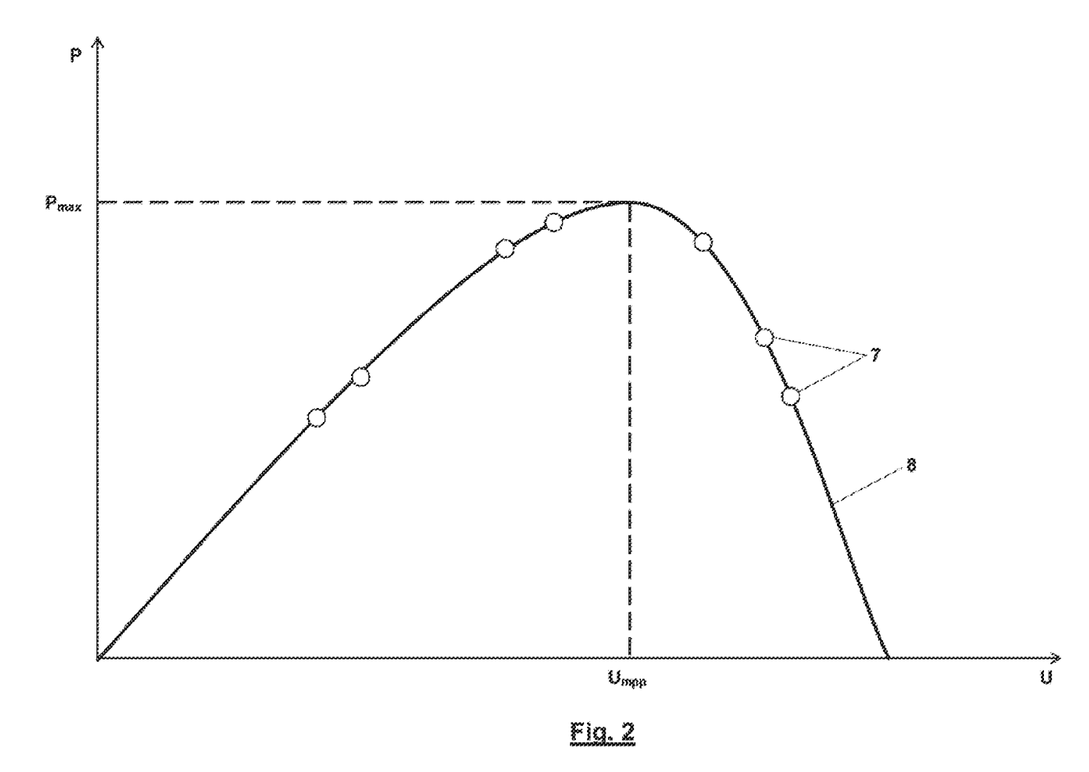
FIG. 2 shows a characteristic curve fitted to virtual operating points of a standard generator under ideal conditions.

FIG. 2 shows a P(U) graph in which the virtual operating points 7 of the standard generator are plotted with respect to the corresponding real operating points of the seven photovoltaic generators 2 according to FIG. 1 for a particular point in time. FIG. 2 furthermore illustrates a characteristic curve 8 fitted to the virtual operating points 7, the characteristic curve having a particular maximum Pmax (Umpp). The maximum Pmax (Umpp) does not correspond to any of the virtual operating points 7 but instead lies here somewhere between them. However, it is possible to determine the present operating point of maximum power of each of the photovoltaic generators 2 and therefore the maximally possible power of each of the photovoltaic generators 2 at the respective point in time from the maximum Pmax (Umpp) taking into account the relationships between the different operating points of the individual photovoltaic generators 2 and the virtual operating points 7 of the standard generator. The sum of the maximally possible powers of the individual photovoltaic generators 2, which can even take into account any power losses, is the sought maximally possible system power of the photovoltaic system 1 at the respective point in time.

According to FIG. 2, all of the photovoltaic generators 2 according to FIG. 1 are operated at such different operating points that seven different virtual operating points result herefrom, of which some are arranged on the one side of the maximum Pmax (Umpp) and some are arranged on the other side. However, proceeding from a model curve for the characteristic curve 8, even a few virtual operating points 7 suffice to be able to ascertain the characteristic curve 8. In addition, the virtual operating points 7 can also all lie on one side of the maximum Pmax (Umpp). In particular, all of the photovoltaic generators 2 can thus be operated in a curtailed manner in that they are operated at a higher voltage than at their operating point of maximum power. Furthermore, a plurality of the photovoltaic generators 2 can also be operated at operating points that correspond to identical virtual operating points 7 of the standard generator.

In this respect, FIG. 2 shows idealized ratios such that all of the virtual operating points 7 fall onto the characteristic curve 8 of the standard generator fitted to the virtual operating points. In practice, this is rather seldom the case since statistical fluctuations occur and also the relationships between the operating points of the individual photovoltaic generators and the virtual operating points 7 of the standard generator cannot be defined ideally, in particular when the relationships would have to take into account more rapid real changes in the differences between the individual photovoltaic generators 2, such as occur for example in the case of different shadings due to rapidly moving clouds. However, even under these conditions, the characteristic curve 8 of the standard generator and the maximum Pmax (Umpp) thereof can be determined well by a large number of different virtual operating points 7 such that a very accurate statement about the presently maximally possible system power can be made. It is therefore possible to maximize the energy fed into the AC grid 5 in the normal case under the boundary condition that the desired control power is reliably available.

Figure 3:
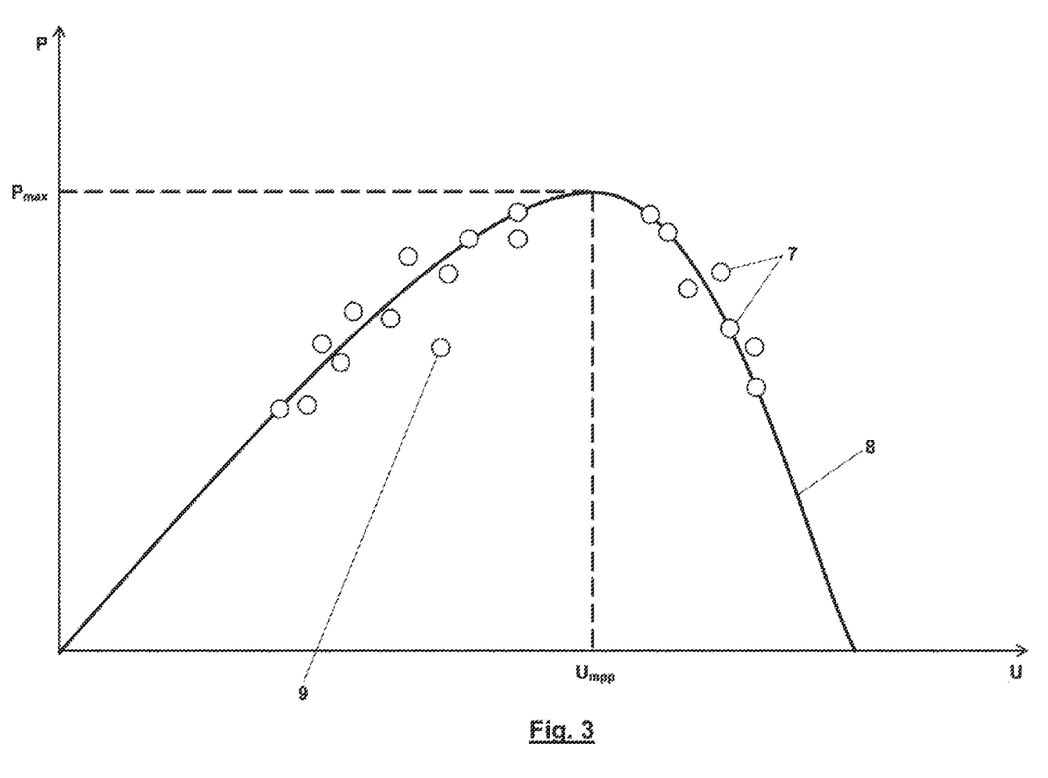
FIG. 3 shows a characteristic curve fitted to virtual operating points of the standard generator under real conditions.

FIG. 3 shows a real distribution of virtual operating points 7, 9, of which one virtual operating point 9 deviates greatly from the characteristic curve 8 of the standard generator fitted to the other virtual operating points 7. The virtual operating point 9 can be discarded for the fitting of the characteristic curve 8 and the great deviation thereof from the characteristic curve 8 can be taken as a reason to redefine the relationships between the operating points of the associated photovoltaic generator 2 and the virtual operating points 7 of the standard generator. Such a redefinition is expedient at least when the corresponding photovoltaic generator 2 delivers a virtual operating point 9 with a great spacing from the characteristic curve 8 over several points in time.

Figure 4:
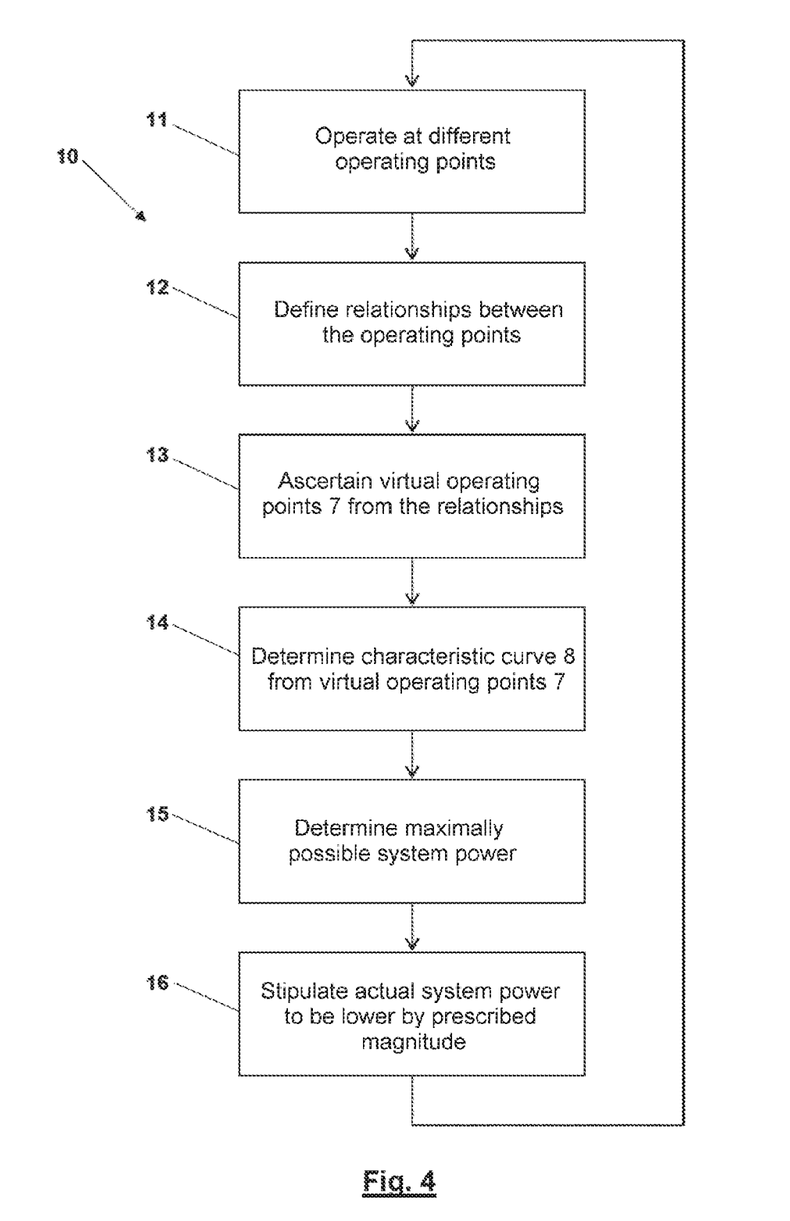
FIG. 4 is a flow diagram of an embodiment of the method according to the disclosure.

The flow diagram 10 shown in FIG. 4 begins with act 11, in which the photovoltaic generators 2 of the photovoltaic system 1 are operated at different operating points by the controller 6 with the aid of the DC/AC converters 3. At 12, relationships between the operating points of the individual photovoltaic generators 2 and the virtual operating points 7 of the standard generator are defined for the respective point in time, which relationships take into account all of the differences between the photovoltaic generators 2 and the operating conditions thereof at the respective point in time as completely as possible, wherein for example during the first start-up of the photovoltaic system 1 it is possible to approximate iteratively the definition of the relationships that take into account all of the differences as completely as possible. In a first approximation, an assumption about the relationships between the operating points of the individual photovoltaic generators 2 and the virtual operating points 7 of the standard generator may thus serve as a definition, for example from the knowledge of the number of connected photovoltaic modules and the interconnection thereof (in series/in parallel) for the respective photovoltaic generators 2. If one individual photovoltaic module is selected as standard generator, the relationship between the power P(U) of the selected standard generator (in the case of a given voltage and known solar radiation strength) and Pi(U) of the i-th photovoltaic generator 2 (in the case of the same voltage and solar radiation strength) can be ascertained arithmetically, that is to say the relationship between the standard generator and the i-th photovoltaic generator 2 can be defined in a first approximation as a factor that describes the number of modules connected in parallel or in series. After the further acts of the method are carried out, this first definition can be refined in acts, see below under "passing through act 12 again".

At 13, the virtual operating points 7 that belong to the present operating points of the photovoltaic generators 2 are then ascertained from the relationships. At 14, the characteristic curve 8 of the standard generator including its maximum Pmax (Umpp) is ascertained on the basis of the virtual operating points 7. From this, at 15, the maximally possible system power of the photovoltaic system 1 is then determined. At 16, the actual system power that is prescribed by the controller 6 is stipulated to be lower than the maximally possible system power by a prescribed magnitude, that is to say the magnitude of the desired control power that is to be made available by the photovoltaic system 1. The maximally possible system power is distributed over the photovoltaic generators 2, that is to say a voltage value or a present setpoint power value is transmitted from the controller 6 to the associated DC/AC converters 3 of the photovoltaic generators, with the result that the sum of powers of all photovoltaic generators 2 of the system results in the desired system power value. This simultaneously constitutes carrying out act 11 again.

When passing through act 12 again, the present values Pi(U) for the i-th photovoltaic generator 2 are compared with the associated virtual operating points 7 of the standard generator P(U) and from this an improved mapping of the values Pi(U) and P(U), that is to say a more precise mathematical relationship between the operating points of the individual photovoltaic generators 2 and the virtual operating points 7 can be inferred.

Acts 11 to 16 proceed repeatedly, wherein the repetition frequency lies in a typical range of 0.01 Hz to 10 Hz.

The invention claimed is:

1. A method for determining a system power, which is maximally possible at a point in time, of a photovoltaic system, comprising a plurality of photovoltaic generators, wherein the photovoltaic system is not operated at the maximally possible system power at the point in time, and wherein at least some of the photovoltaic generators of the plurality of photovoltaic generators are operated at different operating points at the point in time, the method comprising:
    defining a mapping between the different operating points of individual photovoltaic generators and virtual operating points of a standard generator;
    determining the virtual operating points of the standard generator corresponding to the different operating points of the individual photovoltaic generators based on the mapping;
    determining a characteristic curve of the standard generator from the virtual operating points of the standard generator;
    determining a maximum of the characteristic curve; and
    determining the maximally possible system power at the point in time from the maximum of the characteristic curve of the standard generator.

2. The method as claimed in claim 1, further comprising operating the photovoltaic generators at operating points that correspond to at least three different virtual operating points of the standard generator at the point in time.

3. The method as claimed in claim 2, further comprising operating the individual photovoltaic generators at operating points that correspond to virtual operating points of the standard generator which are adjoining the maximum of the characteristic curve.

4. The method as claimed in claim 1, further comprising operating the individual photovoltaic generators at different operating points with the aid of individual DC/DC and/or DC/AC converters.

5. The method as claimed in claim 1, further comprising determining the maximally possible system power at a point in time comprises calculating the maximum powers of the individual photovoltaic generators from the maximum of the characteristic curve of the standard generator and relationships between the operating points of the individual photovoltaic generators and the virtual operating points of the standard generator.

6. The method as claimed in claim 1, wherein relationships between the operating points of the individual photovoltaic generators and the virtual operating points of the standard generator take into account at least one of the following aspects:
    different rated power of the individual photovoltaic generators;
    different types of individual photovoltaic generators;
    production tolerances of the individual photovoltaic generators;
    degeneration effects of the individual photovoltaic generators;
    different orientations of the individual photovoltaic generators toward the sun;
    different shadings of the individual photovoltaic generators;
    different temperatures of the individual photovoltaic generators;
    different types of individual DC/DC and/or DC/AC converter; and
    production tolerances of the individual DC/DC and/or DC/AC converters.

7. The method as claimed in claim 1, further comprising determining relationships between the operating points of the individual photovoltaic generators and the virtual operating points of the standard generator specifically for a respective point in time.

8. The method as claimed in claim 1, further comprising fitting a model characteristic curve to the different virtual operating points to determine the characteristic curve of the standard generator from the different virtual operating points.

9. The method as claimed in claim 8, further comprising discarding virtual operating points that deviate beyond a prescribed extent while fitting the model characteristic curve.

10. The method as claimed in claim 8, further comprising modifying the defined relationships between the operating points of the photovoltaic generators, which belong to the discarded operating points, and the virtual operating points of the standard generator so that the respective virtual operating points approximate the fitted model characteristic curve.

11. The method as claimed in claim 1, further comprising adjusting the different operating points of the photovoltaic generators so that the photovoltaic system is operated at a current system power below the maximally possible system power of the photovoltaic system at that point in time.

12. A photovoltaic system having a plurality of photovoltaic generators, which are connected to individual DC/DC and/or DC/AC converters, and having a controller for the individual DC/DC and/or DC/AC converters, by way of which different operating points of individual photovoltaic generators are able to be set, wherein the controller is configured to:
    define a mapping between the different operating points of the individual photovoltaic generators and virtual operating points of a standard generator;
    determine the virtual operating points of the standard generator corresponding to the different operating points of the individual photovoltaic generators based on the mapping;
    determine a characteristic curve of the standard generator from the virtual operating points of the standard generator;
    determine a maximum of the characteristic curve; and determine the maximally possible system power at the point in time from the maximum of the characteristic curve of the standard generator.

\* \* \* \* \*